Figure 1:
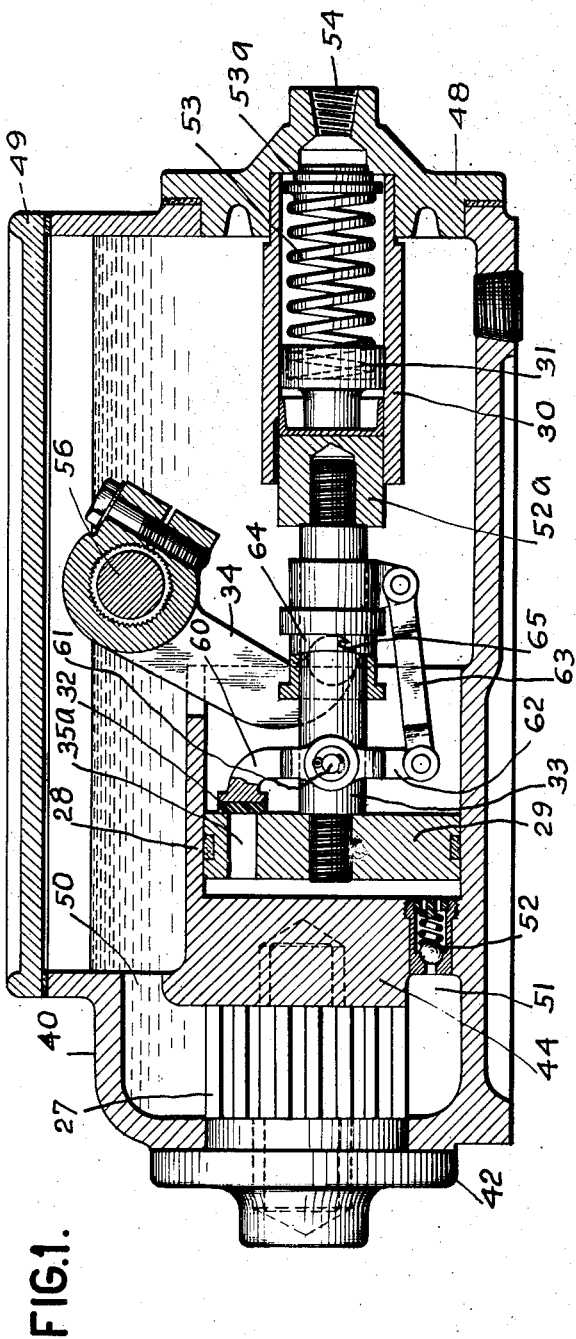

Dec. 6, 1932.  F. I. LIBBEY  1,890,259

CONTROL MEANS FOR A BRAKE SYSTEM POWER UNIT

Filed Dec. 26, 1930

Frederick I. Libbey
INVENTOR

BY his ATTORNEYS
Cooper, Kerr & Dunham

Patented Dec. 6, 1932

1,890,259

UNITED STATES PATENT OFFICE

FREDERICK I. LIBBEY, OF BRONXVILLE, NEW YORK, ASSIGNOR TO AUTOMATIC BRAKE CORPORATION, OF NEW YORK, N. Y., A CORPORATION OF NEW YORK

CONTROL MEANS FOR A BRAKE SYSTEM POWER UNIT

Application filed December 26, 1930. Serial No. 504,683.

This invention relates to vehicle brake systems of the class in which the brakes are applied by energy or force derived from the momentum or movement of the vehicle, under the control, however, of the driver or operator; which control, in the case of an automobile, may be conveniently exercised through the medium of the usual pedal.

More particularly the present invention is directed to an improvement of the system shown and described in my copending application Serial No. 459,213, filed June 4, 1930 for brake systems for automobiles. In the system described in the foregoing application, a power unit was provided adapted to take the place of the so-called master cylinder in foot actuated hydraulic brakes.

The present invention is directed to improvements in the control of the power unit to the general end that simplicity of construction may be obtained, reliability of operation be secured and new and desirable actions secured.

Further and other objects of the present invention reside in the provision of improved control means for the power unit to provide for improved control of the application of brakes and improved control over the pressure of the fluid in the power unit.

A further object of the present invention resides in the provision of an improved brake actuating system in which a reaction is secured at the pedal proportionate to the pressure developed in the power unit and in which the control means are arranged to follow the actuating means at all times.

Further and other objects of the present invention will be hereinafter set forth in the accompanying specification and claims and shown in the drawing which by way of illustration show what I now consider to be a preferred embodiment of my invention.

Figure 2:
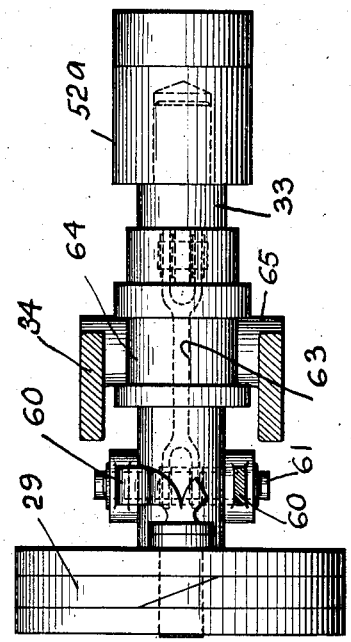

In the drawing:

Figure 1 is a longitudinal sectional view of the hydraulic actuating and control mechanism with control means actuated by the brake pedal to shift suitable valve means and to vary the amount of liquid discharged to thereby control brake actuation; and Fig. 2 is a top plan view of certain parts shown in Fig. 1.

In more detail as in the construction shown in my previous application, the pump gears, one of which is shown at 27, are fitted in a pump chamber at the end of a casing 40, which chamber is closed by a removable head 42. A suitable drive shaft extends into the casing 40 to drive one of the gears which in turn drives the driven gear 27 which gear is journalled in the head 42 and also in the head 44 of the power cylinder 28.

As in my previous construction, a pressure transmitting cylinder 30 is carried inside of the casing 40 in axial alignment with the power cylinder 28 but spaced therefrom and carried by a removable head 48 and the top of the casing is closed by a removable cover 49. The power cylinder 28 is preferably integral with the main body of the casing 40, the head of the cylinder constituting the rear wall of the pump chamber in which the pump gears 27 are located. Above the gears this wall is provided with a port 50 for intake of oil and below is an outlet port 51 for delivery of oil to the cylinder 28. In this latter port is a check valve 52 to prevent reverse flow of the oil. The casing being filled with oil (at least up to the intake port 50) it will be seen that when the car is in motion and the pump gears therefore rotating, the oil is constantly circulated through the intake port 50, discharge port 51, cylinder 28, and an oil-escape port 35a so long as the latter is uncovered by a valve 32.

In the drawing, Fig. 2, the valve 32 is shown in closed position, but it will be understood that with this valve in open position there will be a free passage from the cylinder back into the casing. The capacity of the port 35a being at least as great as the pump outlet port 51, it will be seen that no pressure will be exerted on the piston 29 with valve 32 in wide open position. If, however, the valve 32 is advanced towards the port 35a, the area of escape of the liquid around the periphery of the valve 32 will be decreased with the result that the resulting restriction of the escape of the oil will cause pressure to build up correspondingly in the cylinder 28 and in proportion to the restriction and thereby advancing the piston 29 and its piston rod 33.

At its rear end, the piston rod 33 carries a piston head 52a fitting the auxiliary pressure distributing or transmitting cylinder 30 and arranged to reciprocate therein. The cylinder being aligned with the tubular rod 33 serves as a guide and keeps the piston 29 perpendicular to the axis of the power cylinder 28. In the auxiliary cylinder the head 52a and piston rod 33 are urged leftwardly by a helical spring 53, one end of which bears against a ring 53a seated around the port 54 to which the distributing pipes to the hydraulic brake systems are connected. The other end of the spring is seated in a guide or piston 31 which slides in the cylinder 30. The cylinder 30 to the right of the piston 31 being filled with oil, it will be seen that the advance of the piston 31 by the power piston 29 and piston rod 33 will force oil from the cylinder into the piping connected to 54, thus applying the hydraulic brakes.

*Valve shifting mechanism*

In lieu of the sliding valve heretofore provided, the valve 32 is here used and this valve is carried on a forked arm 60 which arm is in turn pivotally mounted upon a stud 61 carried by the piston rod 33. The valve carrier 60 also is provided with an arm 62 disposed below the pivot 61 and connecting with a link 63 which is in turn connected with a sleeve member 64, provided with a circumferential groove adapted to receive studs 65 carried by a forked arm 34. The forked arm 34 is mounted for rotary adjustment on a rocker shaft 56 and the brake pedal is suitably connected to rock the rocker shaft 56 as in the construction of my previous application.

From the foregoing, the operation of the system when in use will be readily understood. The car being in motion forwardly (and with the pump gears rotating) depression of the brake pedal will rock shaft 56 in an anti-clockwise direction. This motion will shift sleeve 64 to the right with respect to the piston rod 33 and in turn the valve carrier 60 will be rocked anti-clockwise, thereby causing the valve 32 to approach the port 35a and restrict the escape of oil through the port 35a. This will cause power piston 29 to advance, thus applying the brakes as already described.

It will be appreciated that the escape of oil through the port 35a will impart pressure to valve 32 and this pressure reaction will be transmitted back through 62, 63, 64, 65, 34, 56 to the brake pedal, thus apprising the operator of the relative degree of pressure which is being applied to the brakes.

In my previous sliding valve construction such direct pressure reaction was not obtainable to the extent herein obtained and in particular the present embodiment provides for a pressure reaction which is independent of the speed of operation of the pump gears 27. It will be appreciated that with the pump gears rotating at low speed there is a relatively less circulation of oil than with the gears rotating at high speed. However, according to the present system the operator by pressing on the foot pedal can advance the valve 32 until a pressure reaction of desired extent is felt upon the brake pedal. At that time a corresponding brake application will be made.

In the conventional foot actuated brakes, the first part of the movement of the pedal is taken up in bringing the brake bands or brake shoes into contact with the drums. The same is true in the power system illustrated herein, since the port 35a must be partially covered before the pressure can build up in the power cylinder sufficiently to overcome the tension of the spring 53 and such other spring or springs (not shown) as may be employed to effect disengagement of the shoes from the drums when the braking pressure is relieved. As soon as the valve 32 (shifted by the pedal) has covered the port 35a enough to cause the piston rod to move and take up the slack, the resulting movement of the rod 33 will displace pivot pin 61 to the right, thereby displacing valve 32 to the right and uncovering port 35a again, whereupon the rod 33 will cease to advance. However, as the pedal is further depressed, the valve 32 will again approach the port 35a keeping the port partly closed and thus causing the rod 33 to continue its advance as long as pressure is exerted on collar 64 by the pedal.

According to the present invention the brakes are quickly brought into contact with the drums by relatively light pedal pressure and therefore relatively slight restriction by valve 32 after which increased pressure upon the valve will build up braking pressure in relative proportion and furthermore there can be no unintentional locking of the brakes. So, also, as the pedal is allowed to rise, the resulting opening of the port 35a releases pressure and the piston 29 and the rod 33 move back, and the brake shoes move farther from the drums, keeping pace with the upward movement of the pedal. When the shoes come into contact with the drums the advancing movement of the piston rod ceases (except any slight movement permitted by yield of the brake shoe lining) and no further braking pressure is exerted on the drums until additional pressure is exerted on the pedal. If the resulting decrease of the speed of the car is sufficient, the operator exerts no further pressure on the pedal, but if he wants further decrease of car speed, he simply continues to depress the pedal, just as he would do with brakes of the ordinary foot actuated type. As the brake pedal is depressed further the flow at port 35a is restricted more and more, the pressure in the power system is correspondingly increased and the brake shoes are brought against the drums with greater and greater force.

In the event that the liquid pressure or the circulation of oil by the gears fails for any reason, for example, by the breaking of the drive, it is still possible to apply the brakes by manual foot pressure. This will be understood from the following: assume no pressure in cylinder 28. Anti-clockwise rocking of 34 will tend to rock 60 anti-clockwise until 32 contacts with the piston 29, thereafter direct manual action will be applied through pin 61 to move 33 to the right and apply the brakes as in the usual power operation. From all of the above it will be seen that the braking effect not only follows the operation of the pedal and also there is a proportional brake reaction at the pedal which is directly proportional to the braking power being effected upon the brakes.

Summarizing according to the present system, brake reaction is provided at the pedal which is always proportional to the braking effect obtained. The pressure at the pedal while not as high as the braking pressure is always proportional to such pressure and this relation is maintained notwithstanding changes in the rate of flow of the oil due to changes in pump speed.

It will be understood that the control of the power unit is secured by the valve 32 and the operation of this valve depends upon the tension which may exist between the operator controlled element, i. e. 56 and the brake actuating mechanism. This control is interdependent both upon the relative positions and pressures of and upon the operator controlled element and of and upon the brake actuating element.

What I claim is:

1. In an operator controlled fluid pressure brake system for vehicles, a pump, fluid pressure actuated mechanism including a brake actuating part, receiving fluid under pressure from the pump and having a fluid escape port which moves in correspondence with the brake actuating operation of the mechanism, a valve pivotally mounted upon said brake actuating part and bodily shiftable therewith and tiltably operable by the operator into cooperation with said port in said fluid pressure actuated mechanism, and means for transmitting a reaction force to the operator from said valve to apprise the operator of the relative braking force being applied by said mechanism.

2. A power unit for a hydraulic brake system, including a pump, a power cylinder having a piston therein, a fluid escape port in said piston, the aforesaid cylinder being adapted to receive liquid from the aforesaid pump, a piston rod connected to the aforesaid piston, another piston connected to said piston rod, which latter piston is adapted to build up pressure for the hydraulic brake system, a brake pedal actuated means, a control valve pivotally mounted upon the aforesaid piston rod for automatically following up shifting movement with the piston so that the valve may be kept in maintained relation to the fluid escape port in said piston, and connections between said brake pedal actuated means and the valve to tilt the latter toward the piston upon actuation of said brake pedal actuated means, said connections also providing for a pressure re-action related to the pressure in the cylinder to be communicated to the brake pedal actuated means.

3. A power unit for a hydraulic brake system, including in combination, a pump, a cylinder receiving liquid therefrom, a piston in said cylinder, said piston being provided with a fluid escape port, a supplemental cylinder and piston therefor, a piston rod connecting the first mentioned piston, a member slidable upon the aforesaid piston rod and adaptable for shifting under pedal control, a valve member pivotally mounted upon the said piston rod and cooperating with the aforesaid fluid escape port in the piston, and means connecting the said valve member and the aforesaid slidable member to rock the valve into cooperation with the fluid escape port in the piston as the slidable member relatively slides upon the piston rod.

4. A power unit for a hydraulic brake system including a pump, a power cylinder, a piston therein, a supplemental cylinder and a piston therein, a piston rod connecting the first and second mentioned pistons, said first mentioned piston having a fluid escape port therein, a brake pedal actuated member, a member slidable upon the piston rod and shiftable relatively to the piston rod by the brake pedal actuated member, a valve adapted for cooperation with the fluid escape port in the first mentioned piston, said valve being pivotally mounted upon a part movable with the piston so as to be bodily shiftable with the movement of the piston and the piston rod upon movement of the piston with a maintained aperture between said valve and the fluid escape port in the piston, and means inter-connecting said valve and the slidable member for the dual purpose of tilting the valve and varying its position with respect to the fluid escape port and the piston upon relative movement of the sliding member and the piston rod and for transmitting back to the brake pedal actuated means a forced reaction which is proportional to the pressure built up in the aforesaid power cylinder.

5. The invention set forth in claim 4 in which the slidable member is disposed for cooperation with a part associated with the supplemental piston for directly mechanically displacing the supplemental piston by the slidable member upon an extreme movement being imparted to the slidable member by the brake pedal actuated means.

In testimony whereof I hereto affix my signature.

FREDERICK I. LIBBEY.